United States Patent

[11] 3,581,105

| [72] | Inventor | David B. Gish |
| | | Pasadena, Calif. |
| [21] | Appl. No. | 761,698 |
| [22] | Filed | Sept. 23, 1968 |
| [45] | Patented | May 25, 1971 |
| [73] | Assignee | Bell & Howell Company |
| | | Chicago, Ill. |

[54] SWITCHING APPARATUS
13 Claims, 6 Drawing Figs.

[52] U.S. Cl. ..................................................... 307/116,
340/258
[51] Int. Cl. ...................................................... H01h 35/00
[50] Field of Search .......................................... 307/116,
118, 117, 112; 340/258, 259

[56] References Cited
UNITED STATES PATENTS
3,255,380   6/1966   Atkins et al. ................ 307/116X Primary Examiner—Robert K. Schaefer
Assistant Examiner—H. J. Hohauser
Attorney—David Weiss ABSTRACT: A two-terminal switching apparatus which includes a transducer requiring drive energization for producing a sensing capability. The transducer and a switch are parallel connected across the terminals, and one of the terminals is connectable to a source of electrical energy through an external load, while the other terminal is connectable to common. A preset voltage difference appears across the terminals when the switch is conducting, which voltage difference is sufficient to permit transducer drive continuity.

PATENTED MAY 25 1971 3,581,105

David B. Gish,
INVENTOR.
BY:
David Weiss
ATTORNEY.

David B. Gish,
INVENTOR.
BY.
ATTORNEY.

SWITCHING APPARATUS

BACKGROUND OF THE INVENTION

1. Field of the Invention

This invention relates to externally controlled switching devices, and more particularly to a proximity-sensitive switch.

2. Description of the Prior Art

As used herein, a "drive-active" transducer is one which requires driving energization in order to produce a sensing capability. For example, the term includes transducers utilizing sensing devices which generate electromagnetic fields and which are sensitive to changes occurring within the generated fields, such changes being produced by external conditions. Similarly, ultrasonic transducers require energization to generate ultrasonic pulses which can be received (by reflection) and compared with a generated reference signal, for producing a signal representing an external condition (such as a flaw in a metal workpiece). Other types of drive-active transducers include those in which a change in electrical conductivity of a sensing element varies with external conditions, such as transducers utilizing elements wherein the electrical conductivity changes with incident light, applied temperature or applied force. In each of these examples, the transducer requires an electrical drive input which acts upon the sensing element, in order to translate a particular external condition into an electrical signal.

When the generated electrical signal is used to control a switching device, an electrical current path can be completed through the switch whenever the particular external condition is sensed by the transducer. By incorporating the switch within a circuit which includes an interconnected load and electrical energy source, the load current can be switched on and off in accordance with the presence or absence of a particular external condition. The sensed condition, for example, can be the occurrence of a particular external event, or conversely the nonoccurrence of such an event.

The use of drive-active transducer-controlled switches is well known to the prior switching art. All of these prior devices, however, are characterized by their having connectors or terminals for receiving the transducer driving energy which are different that the switch terminals connectable to the load circuitry.

For example, in such prior art devices which can utilize the energy source available to the load as a source of transducer driving energy, no less than three terminals have been employed in the past. One of these terminals is connectable to the energy source while the second terminal is connectable to ground potential or common, for supplying power to the drive-active transducer. The third terminal is generally connectable to one side of the load (which has its other side connected to the energy source, e.g., to the first terminal) and represents one side of the switch. The other side of the switch is connected to common, e.g., to the second terminal.

SUMMARY OF THE INVENTION

The present invention provides an active transducer-controlled switching device which combines both the driving power input and the switch output across a single pair of terminals. Such a switching device can be connected into an electrical circuit with the two-terminal simplicity of a conventional switch, while the transducer is continually driven to maintain its sensing capability.

This is accomplished by connecting a switch means in parallel with an active transducer means, the parallel combination connected between a pair of terminals. The first terminal is connectable to an external circuit load which in turn is connected to an electrical energy source such as a voltage supply, so that the first terminal is not directly connected to the voltage supply but is coupled to the supply through the load. The second terminal is connectable to the other side of the voltage supply, or to common. Drive input power is supplied to the active transducer means through the circuit load, and the switching states of the switch means are controlled by the transducer in accordance with sensed external conditions.

During open switch operation, a small current flows through the load; during closed switch operation, a large voltage drop is presented across the load and load current flows therethrough. The switch means is provided with means for maintaining a predetermined minumum voltage drop or potential difference across the terminals during closed switch operation, permitting the continuation of drive power to the drive-active transducer means.

According to a preferred embodiment of the present invention, the drive-active transducer means includes a power regulator means for receiving the drive input power and for applying drive power to an included sensor means, which applied power is regulated for constant voltage regardless of the state of the switch means. The sensor output signal is transmitted to an included switch control means, which generates a switch actuation signal when specified information representing the presence (or absence) of the particular external condition is contained by the sensor output signal. The switch means can be normally open or normally closed, switching however to the opposing state when the switch actuation signal is applied thereto.

In one configuration of the preferred embodiment of the drive-active transducer-controlled switching apparatus of the present invention, a "proximity switch" is provided. An external circuit can be closed in accordance with the approach of a detectable member towards the vicinity of the sensing portion of the drive-active transducer, and the load current is caused to flow through the circuit for as long as the member remains within a desired range of proximity to the sensor (the particular external condition in this situation). If the circuit load is an indicating device such as an electric lamp, the closing of the circuit causes the lamp to present a visible indication of member proximity.

A proximity switch connected to an indicating device can be utilized, for example, to monitor the position of mechanisms having two alternate positions, such as the landing gear and the landing gear door of an airplane, without relying upon mechanical means of switch actuation. At present, landing gear position monitoring is generally performed by the use of microswitches which are mechanically actuated by an external control member. Such mechanical switches are inherently unreliable, since their moving parts are susceptible to wear and misalignment. Further, such mechanical switches are often incapable of being hermetically sealed, permitting contamination of the switch contacts.

The two-terminal proximity switch of the present invention combines reliability of operation with ease of installation. According to a preferred configuration thereof, the proximity switch includes a sensor which electrically responds to the relative position of an electrically conductive member. An oscillator having a tank circuit which includes primary inductor, is driven by the circuit voltage source (through the circuit load and the power regulator means) to provide a normally balanced flux bridge with a secondary inductor. When the conductive member enters the flux bridge, a flux imbalance occurs and the amplitude of the secondary output voltage is increased. After amplification of the secondary voltage, the resultant sensor output signal is applied to the switch control means, which can be a differential Schmitt trigger. At a preset level of sensor output amplitude, which represents a predetermined position of the conductive member within the flux bridge, the trigger generates a switch actuation signal which causes the switch means to close.

The switch means preferably includes solid-state devices, such as switching transistors which are operative by the switch actuation signal. The switch means further preferably includes solid-state means for providing a predetermined minimum potential difference across the terminals during closed switch operation (for maintaining operability of the power regulator means), such as a normally nonconducting string of diodes, or a Zener diode which breaks down during closed operation.

BRIEF DESCRIPTION OF THE DRAWINGS

The novel features which are believed to be characteristic of the invention, together with further advantages thereof, will be better understood from the following description considered in connection with the accompanying drawings in which apparatus according to the invention and a preferred embodiment thereof are illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
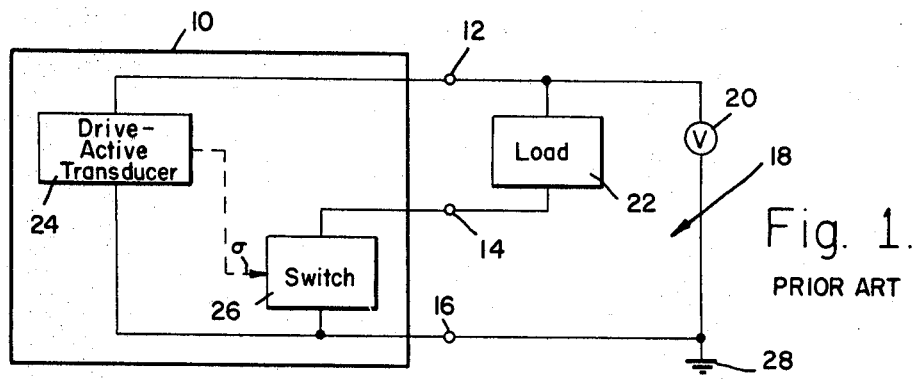
FIG. 1 is a block diagram of drive-active transducer-controlled switching apparatus within the prior art.

Turning first to FIG. 1, a prior art drive-active transducer-controlled switching device 10 is provided with at least three terminals, such as a first terminal 12, a second terminal 14 and a third terminal 16. The terminals 12, 14, 16 are adapted for connection into an external electrical circuit 18 which includes a source of electrical energy such as a voltage source 20, and a load 22.

The switching device 10 includes a drive-active transducer means 24 connected to receive its driving power across the first and third terminals 12, 16. The active transducer 24 is responsive to an external stimulus such as the occurrence of a particular event or the presence of a particular condition, for thereupon generating a switch control signal $\sigma$ which is applied to a normally open switch means 26.

The switch means 26 is connected within the switching device 10 such that the switch output is provided across the second and third terminals 14, 16, which in turn are adapted to be connected into the circuit 18 for establishing a normally open path within the circuit. The third terminal 16 can be connected to the low voltage side of the voltage source 20, or to common as indicated by the conventional ground symbol 28. Drive power is applied to the drive-active transducer means 24 by connecting the first terminal 12 to the voltage side of the voltage source 20, bypassing the load 22. Alternatively, the first terminal 12 can be connected to a separate source of electrical energy (not shown).

During operation, the switch means 26 is actuated into a closed state when the switch control signal $\sigma$ is applied thereto. This causes the switch output terminals (i.e., the second and third terminals 14, 16) to be shorted, permitting load current to flow through the circuit load 22.

Figure 2:
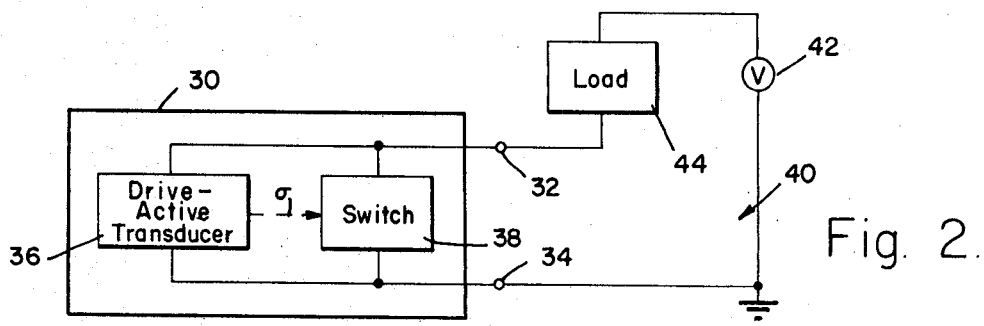
FIG. 2 is a block diagram of drive-active transducer switching apparatus according to the present invention.

Turning to FIG. 2, a drive-active transducer-controlled switching device 30 in accordance with the present invention is provided with a first terminal 32 and a second terminal 34, comprising a single pair of terminals in contrast to the greater number of terminals required in prior art devices. The pair of terminals 32, 34 serve as drive power input terminals for a drive-active transducer means 36, as well as switch output terminals for a switch means 38. Accordingly, the drive-active transducer means 36 and the switch means 38 are parallel connected with respect to one another across the pair of terminals 32, 34.

The switching device 30 is adapted to be connected into an external electrical circuit 40, which includes a source of electrical energy such as a voltage source 42, and a load 44. In operation, the first terminal 32 is connected to the voltage source 42 through the load 44, while the second terminal 34 is connected to the relatively low voltage side of the voltage source 42 or to common, impressing upon the first terminal 32 a first voltage level referred to common.

The drive-active transducer means 36 is responsive to an external stimulus, such as the occurrence of a particular event or the presence of a particular condition, for generating a switch control signal $\sigma$ (as in the prior art device 10 shown in FIG. 1) which causes the normally open switch means 38 to close. (Alternatively, the switch means 38 can be normally closed and the generated switch control signal $\sigma$ can cause the switch means 38 to open.) In contrast to the prior art devices, however, closed switch operation should not cause the first terminal 32 to be shorted to common, since the transducer means 36 must remain active. The closed state of the switch means 38 is therefore a low impedance state, providing a potential difference across the first and second terminals 32, 34 (changing the impressed voltage at the first terminal 32 to a second level referred to common) which is sufficient to maintain operability of the transducer means 36.

Figure 3:
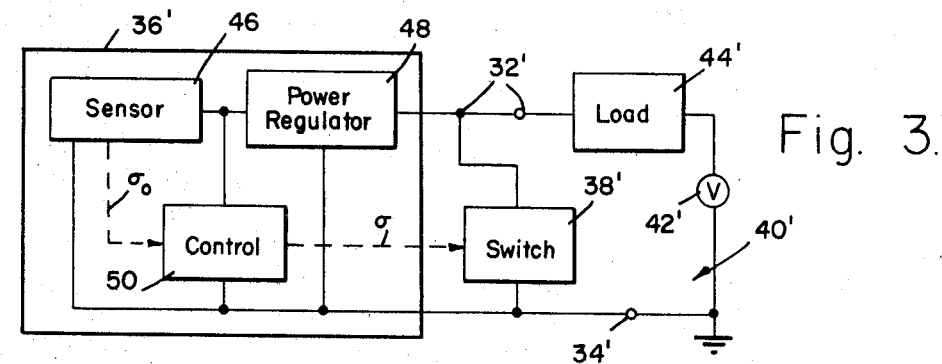
FIG. 3 is a block diagram of a preferred embodiment of apparatus according to the present invention.

In the preferred embodiment of FIG. 3, a preferred configuration of a drive-active transducer means 36' is shown. Primed reference numerals are utilized in FIG. 3 to identify elements similar to correspondingly referenced elements of FIG. 2.

Sensor means 46 requiring driving energization in order to produce a sensing capability therefrom, is driven at a constant voltage (which is small in magnitude relative to the potential of the voltage source 42') by a power regulator means 48 having a power input connected across the pair of terminals 32', 34'.

A sensor output signal $\sigma_o$ is generated by the sensor means 46 and is applied to a switch control means 50 having a power input connected between the output of the power regulator means 48 and the second terminal 34'. When a particular external condition or event is sensed by the sensor means 46, intelligence representing such occurrence is contained by the sensor output signal $\sigma_o$, causing the switch control means 50 to generate the switch actuation signal $\sigma$ which is applied to the switch means 38'. In the preferred embodiment, the switch actuation signal $\sigma$ persists for as long as the particular condition or event is sensed by the sensor means 46, and it is not generated at other times.

Since the transducer means 36' is driven by the voltage source 42' through the load 44', current will flow through the load 44' at all times regardless of the state assumed by the switch means 38'. The power regulator means 48 maintains the operating voltage to the sensor means 46 and to the control means 50 (and hence the current through the transducer means 36') constant and of relatively small magnitude, so that during open switch operation the current flowing through the load 44' is also small compared to the load current and remains constant. When the switch means 38' is actuated to assume its low impedance or closed state, load current flows through the external circuit 40' (and of course through the switch means 38') while a preset voltage drop appears across the switch means 38' for permitting continuity in drive input to the power regulator means 48.

These characteristics permit easily installed means for monitoring the operability of the drive-active transducer-controlled switching device of the preferred embodiment of the present invention. For example, an ammeter (not shown) can be connected in series with the load 44', and/or a voltmeter can be coupled across the terminals 32', 34'. By monitoring the circuit current for open open switch operation, and the voltage across the terminals 32', 34' for the closed switch operation, the apparatus can be continually monitored to assure proper operation thereof.

Figure 4:
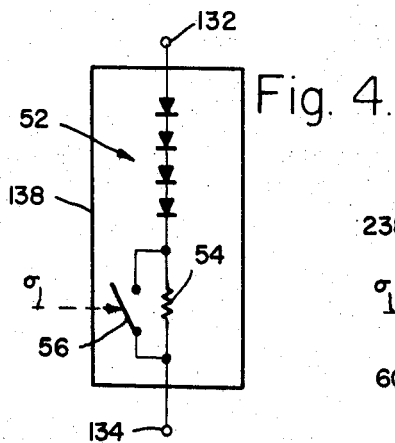
FIG. 4 is a schematic diagram of a first possible configuration of the switch means shown in FIGS. 2 and 3.

Turning to FIG. 4, there is shown a first possible switch configuration 138 of the switch means shown in FIGS. 2 and 3, connected between a first terminal 132 and a second terminal 134. The first terminal 132 is connectable to a source of positive voltage through a circuit load, while the second terminal 134 is connectable to common.

A diode bank 52 is connected in series with a high-resistance resistor 54 across the pair of terminals 132, 134. Shorting means 56 is provided across the resistor 54, for shorting the diode bank 52 to ground when the switch actuation signal $\sigma$ is applied thereto. When this occurs, the normally nonconducting diode bank becomes forward biased, so that load current flows through the diode bank 52 to the grounded second terminal 134, while a voltage drop appears across the diode bank 52. The diodes of the bank 52 are selected with respect to both quantity and characteristics, so that the voltage appearing at the first terminal 132 during closed switch operation is sufficient to adequately drive the power regulator means 48 for maintaining operability of the sensor means 46 and the control means 50 (FIG. 3).

Figure 5:
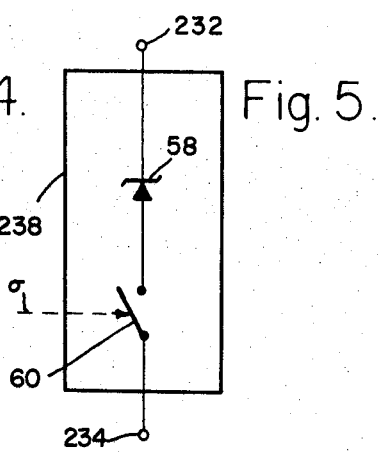
FIG. 5 is a second possible configuration of the switch means shown in FIGS. 2 and 3.

A second possible configuration of a switch means 238 is shown in FIG. 5. A breakdown or Zener diode 58 is connected to a first terminal 232 which is connectable to a voltage source through a load as shown in FIG. 3. A second terminal 234 is connectable to common, and shorting means 60 are provided for shorting the anode of the Zener diode 58 to common when the switch actuation signal $\sigma$ is applied to the shorting means 60. When this occurs, the Zener diode 58 breaks down and load current flows therethrough to common, while a voltage drop appears across the Zener diode 58, providing the necessary voltage at the first terminal 232 for maintaining operability of the transducer means.

Figure 6:
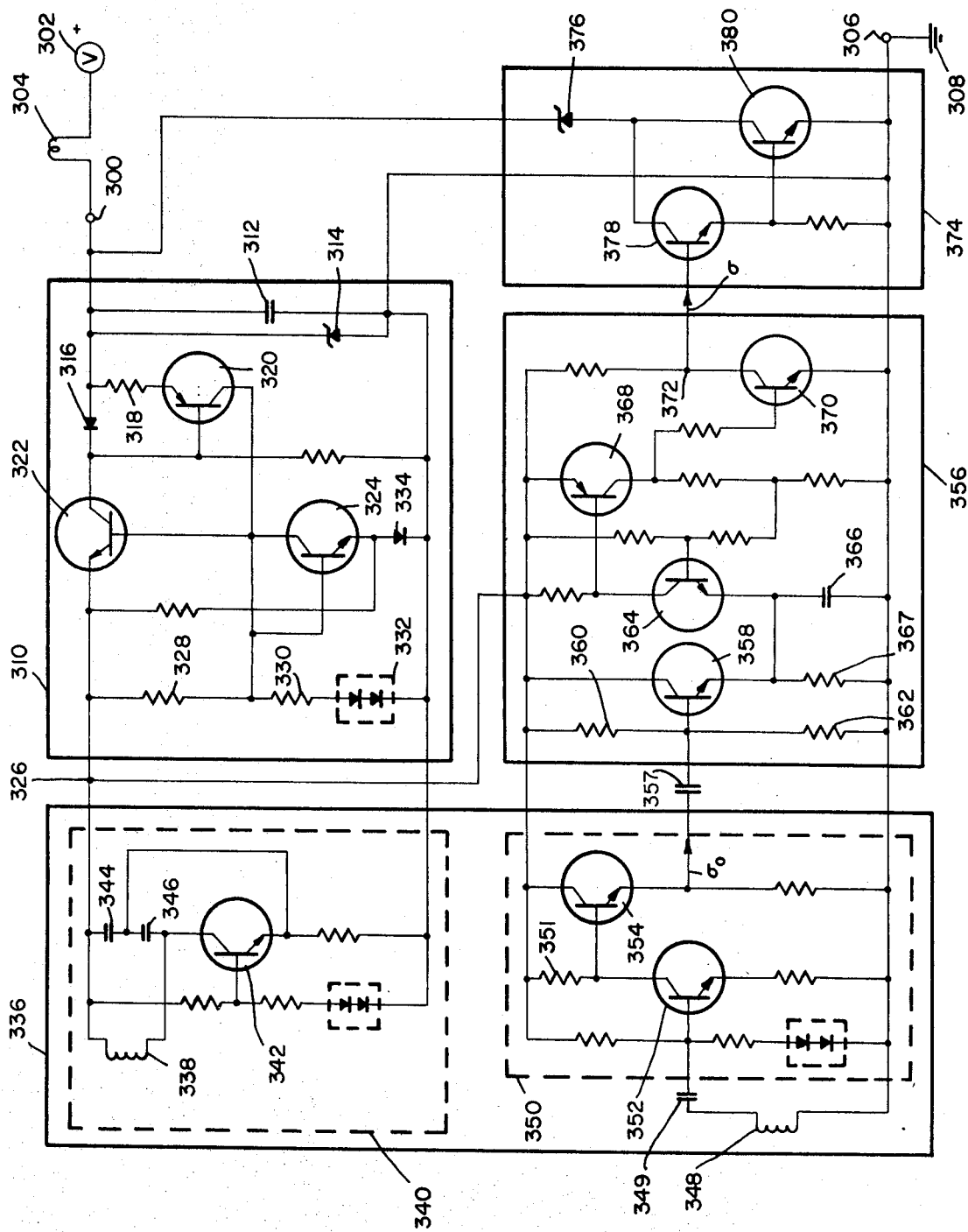
FIG. 6 is a circuit diagram of a proximity switch configuration according to the preferred embodiment of the present invention shown in FIG. 3.

Turning to FIG. 6, a proximity switch configuration of the preferred embodiment is sensitive to presence of an electrically conductive member (not shown). A first terminal 300 is connectable to a source of positive DC voltage 302 through a load such as an indicating lamp 304. A second terminal 306 is connectable to common, as indicated by a conventional ground symbol 308.

The voltage the terminals 300, 306 is used to drive a power regulator 310, which is a typical series voltage regulator having a preregulator stage. A filter capacitor 312 is provided at the power regulator input for shunting any AC appearing thereat to common, while a Zener diode 314 provides a low impedance path for transients. A preregulator stage is provided at the regulator input, and includes a diode 316, a resistor 318 and a transistor 320, and the constant current preregulator output is applied to the base of a control transistor 322 and to the collector of an amplifier-comparison transistor 324.

The output voltage of the regulator 310, appearing across a junction 326 and common, is sampled by a voltage divider (sampling resistors 328, 330) across the regulated output. A diode bank 332 can be inserted into the circuit as shown, for providing temperature compensation.

The sampled voltage is compared by the amplifier-comparison transistor 324 with a reference voltage provided by the reference diode 334, and any error is amplified by the amplifier-comparison transistor 324 and is applied to the base of the control transistor 322, thereby controlling the voltage drop across the control transistor 322.

The constant voltage appearing at the junction 326 is small in magnitude relative to the voltage at the source 302. For example, for a 28-volt source, a regulated voltage of 3 volts is appropriate at the junction 326.

The output of the regulator 310 appearing at the junction 326 (referred to common) is applied as a power input for driving a sensor 336. The sensor 336 includes a first inductor or drive coil 338 which forms a portion of the tank circuit of an oscillator such as a feedback oscillator 340 of the Colpitts type. An amplifier transistor 342 has its emitter tapped between two capacitors 344, 346 of the tank circuit, and feedback is provided therebetween because of the situating of the drive coil 338 between the collector of the amplifier transistor 342 and the junction 326.

The drive coil 338 produces an alternating magnetic flux pattern. A second inductor or pickup coil 348 is positioned within this field so that perturbations in the flux pattern will be sensed by the pickup coil 348. For example, the pickup coil 348 can be oriented at approximately 90° to the drive coil 338, so that a balanced flux bridge is formed therebetween. When an electrically conductive member is brought near the combination, a flux imbalance occurs and an alternating voltage is induced in the pickup coil 348. For a particular conducting member, the amplitude of the pickup coil output signal is a function of the degree of imbalance in the flux pattern, or the degree of proximity of the conducting member to the drive coil-pickup coil combination 338, 348.

The signal induced in the pickup coil 348 is amplified by a power amplifier 350. For example, the induced signal can be applied to the base of a voltage amplifier transistor 352 (through a coupling capacitor 349), current being supplied to the collector of the transistor 352 through a resistor 351 connected between the collector and the junction 326. Current amplification is provided by an emitter follower transistor 354.

The output signal $\sigma_o$ of the sensor means 336 is applied to the input of a trigger circuit 356, through a coupling capacitor 357 which isolates the differences in the DC voltages between the sensor output and the trigger input. When the amplitude of the sensor output signal $\sigma_o$ is above a critical level, the trigger circuit 356 generates an output signal (the switch actuation signal $\sigma$) which is a pulse having a duration corresponding to the time that the amplitude of the sensor output signal $\sigma_o$ is above the critical level.

For example, the sensor output signal $\sigma_o$ is applied to the base of a normally nonconducting first switching transistor 358, and the oscillations of the sensor output signal $\sigma_o$ are biased with respect to a DC voltage which is preset by voltage divider resistors 360, 362. When the instantaneous voltage of the biased sensor output signal $\sigma_o$ exceeds a predetermined trigger level (determined by the characteristics of the first switching transistor 358), the first switching transistor 358 conducts and regeneratively turns off a normally conducting second switching transistor 364.

During times when the second switching transistor 364 is conducting, it maintains a filter capacitor 366 in a charged condition. When the peak amplitude of the sensor output signal $\sigma_o$ exceeds the critical level, but its instantaneous voltage is below the critical level, the voltage drop across an emitter resistor 367 is maintained at a sufficiently high magnitude by the discharging of the filter capacitor 366, for keeping the second switching transistor 364 in its nonconducting state. During normal conditions, a normally conducting third switching transistor 368 maintains the base of a normally conducting fourth switching transistor 370 in saturation, maintaining a trigger output junction 372 substantially at ground potential or common. When the second switching transistor 364 is nonconducting, however, the third switching transistor 368 cuts off, turning off the fourth switching transistor 370. This causes a voltage to appear at the trigger output junction 372, providing the switch actuation signal $\sigma$.

Finally, a switch means 374 is connected between the first and second terminals 300, 306, and to the trigger output junction 372. In the configuration shown, for example, the switch means 374 includes a Zener diode 376 having its cathode connected to the first terminal 300 and its anode connected to the collectors of a normally nonconducting fifth switching transistor 378 and a normally nonconducting sixth switching transistor 380. The fifth and sixth switching transistors 378, 380 are connected to form a Darlington connection, and the emitter of the sixth switching transistor 380 is connected to the second terminal 306.

When a switched actuation signal $\sigma$ is applied to the base of the fifth switching transistor 378, this transistor switches to a conductive state, providing a voltage drop to be established across the Zener diode 376 which exceeds its Zener level. The consequent breakdown of the Zener diode 376 causes base saturation of the sixth switching transistor 380, switching this transistor into a conducting state. This establishes a conducting path between the first and second terminals 300, 306, causing load current to pass through the indicating lamp 304, thereby signaling proximity of the electrically conducting member to the drive coil-sensing coil combination 338, 346. At the same time, the voltage across the Zener diode 376 remains substantially constant and independent of current, and this Zener level can be selected so that the regulator 310 is maintained in operation.

During times when the switch actuation signal σ is not present (corresponding to times when the conducting member is not in proximity to the drive coil-sensing coil combination 338, 346), the fifth switching transistor 380 is also nonconducting. During these times, therefore, the switch means 374 is nonconductive, and load current does not flow through the indicating lamp 304.

Thus, there has been shown a preferred embodiment of a two terminal drive-active transducer-controlled switching device, and a proximity switch configuration thereof. Other embodiments of the present invention, and modifications of the embodiment and the proximity switch configuration herein presented, may be developed without departing from the essential characteristics thereof.

For example, the sensor means of the proximity switch configuration can be responsive to electrically nonconductive members as well as to conductive members, such as by utilizing variable feedback oscillators. Furthermore, ultrasonic methods and apparatus can be utilized; for example, the sensor means can include an ultrasonic generator and receiver, and the switch control means can receive the reflected ultrasonic pulses for comparison with generated timing pulses having timed intervals corresponding to a predetermined reflection distance.

Accordingly, the invention should be limited only by the scope of the claims listed below.

What I claim is:

1. Switching apparatus comprising the combination of:
   a first terminal and a second terminal;
   drive-active transducer means connected across said terminals and adapted to be driven by a source of electrical energy through a load connectable to said first terminal, said second terminal connectable to common, for detecting presence of a particular external condition when driven and for generating a switch actuation signal when said condition is detected; and
   switch means connected across said terminals and having a nonconducting state and a conducting state, said conducting state permitting drive continuity of said drive-active transducer means while providing a conductive path between said terminals, said switch means coupled to said drive-active transducer means for receiving said switch actuation signal and operable to provide one of said states when said signal is applied thereto and the other of said states at other times.

2. The apparatus according to claim 1, above, wherein said switch means is operable to provide said conducting state when said signal is applied thereto and said nonconducting state at other times.

3. The apparatus according to claim 1, above, wherein said drive-active transducer means includes:
   regulator means having a drive input connected across said terminals, and an output, for receiving electrical energy applied to said first terminal and for producing an unchanging voltage referred to common at said output;
   sensor means having a drive input connected across said regulator output and said second terminal, and drivable by said unchanging voltage to produce a capability for sensing presence of the particular external condition and for generating a sensor output signal including intelligence relating to said presence when driven; and
   switch control means having a drive input connected across said regulator output and said second terminal, said switch control means connected to receive said sensor output signal, for generating said switch actuation signal when said sensor output signal includes intelligence representing said presence.

4. For combination with a series connected arrangement of a load and an electrical energy source, switching apparatus comprising the combination of:
   a pair of terminals for connection across the series connected arrangement of the load and the electrical energy source;
   switch means connected across said terminals for providing a conductive path between said terminals when a switch actuation signal is applied to said switch means, and for providing a nonconductive path between said terminals at other times; and
   drive-active transducer means having a drive input connected across said terminals, and a signal output connected to said switch means, said drive-active transducer means capable of sensing a particular external condition when at least a predetermined potential difference is applied across said terminals, and for generating said switch actuation signal at said signal output when said condition is sensed.

5. The apparatus according to claim 4, above, wherein said switch means include means for maintaining said predetermined potential difference across said terminals when said conductive path is provided.

6. Switching apparatus comprising the combination of:
   a terminal adapted to be coupled to a source of electrical energy through a load for normally impressing upon said terminal a voltage at a first level referred to common;
   switch means connected to said terminal for changing the impresses voltage to a second level referred to common; and
   drive-active transducer means connected to said terminal and drivable by either of said voltage levels for sensing a particular external condition, said drive-active transducer means coupled to said switch means for controlling said switch means to change the impressed voltage at said terminal to said second level when said condition is sensed.

7. The apparatus according to claim 6, above, wherein said second level is lower than said first level.

8. Proximity sensitive switching apparatus, comprising the combination of:
   a first terminal and a second terminal;
   drive-active transducer means connected across said terminals and adapted to be driven by a source of electrical energy through a load connectable to said first terminal, said second terminal connectable to common, for sensing proximity of an external member when said drive-active transducer means is driven and for generating a switch actuation signal when member proximity is detected; and
   switch means connected across said terminals and having a normally nonconducting state and a conducting state, said conducting state permitting drive continuity of said drive-active transducer means while providing a conducting path between said terminals, said switch means coupled to said drive-active transducer means for receiving said switch actuation signal and operable to provide said conducting state when said signal is applied thereto and said nonconducting state at other times.

9. The apparatus according to claim 8, above, wherein said switch means includes means for maintaining a predetermined voltage difference across said terminals when said conductive path is provided, for permitting drive continuity of said drive-active transducer means.

10. The apparatus according to claim 8, above, wherein said drive-active transducer means includes:
   regulator means having a drive input connected across said terminals, and an output, for receiving electrical energy applied to said first terminal and for producing an unchanging voltage referred to common at said output;
   sensor means having a drive input connected across said regulator output and said second terminal, and drivable by said unchanging voltage to produce a capability for sensing proximity of an external member and for generating a sensor output signal including including intelligence relating to member proximity when driven; and switch control means having a drive input connected between said regulator output and said second terminal, said switch control means connected to receive said sensor output signal, for generating said switch actuation signal when said sensor output signal includes intelligence representing a predetermined degree of member proximity to said sensor means.

11. The apparatus according to claim 10, above, wherein said sensor means generates an electromagnetic flux field when driven, and is sensitive to the degree of penetration within said field of an electrically conductive member.

12. Proximity indicating apparatus comprising the combination of:
a first terminal;
a second terminal connected to common;
a voltage source;
electrically operable indicating means series connected between said voltage source and said first terminal;
drive-active transducer means connected across said first and second terminals and driven by said voltage source through said indicating means for sensing proximity of an external member and for generating a switch actuation signal when a predetermined degree of member proximity is neglected and
switch means connected across said terminals and having a normally nonconducting state and a conducting state, said conducting state permitting drive continuity of said drive-active transducer means while providing a conducting path between said terminals, said switch means coupled to said drive-active transducer means for receiving said switch actuation signal and operable to provide said conducting state when said signal is applied thereto and said nonconducting states at other times.

13. The proximity indicating apparatus according to claim 12, above, wherein said indicating means is a lamp operatively energized when said conducting state is provided by said switch means.

UNITED STATES PATENT OFFICE
CERTIFICATE OF CORRECTION

Patent No. 3,581,105          Dated May 25, 1971

Inventor(s) David B. Gish

It is certified that error appears in the above-identified patent and that said Letters Patent are hereby corrected as shown below:

Column 1, line 42, the word "that" should read "than".
Column 2, line 54, after "includes" insert --a--;
           line 75, after "closed" insert --switch--.
Column 4, line 66, delete the word "open" in the second occurrence.
Column 5, line 35, after "voltage" insert --across--.
Column 7, line 10, after "the fifth switching transistor" insert
           --378 remains in its normally nonconducting state, so that
           the sixth switching transistor--.
Column 8, line 21, the word "include" should read "includes";
           line 29, the word "impresses" should read "impressed";
           line 74, delete the word "including" in the second occurrence.
Column 10, line 5, the word "neglected" should read "detected".

Signed and sealed this 28th day of December 1971.

(SEAL)
Attest:

EDWARD M. FLETCHER, JR.           ROBERT GOTTSCHALK
Attesting Officer                 Acting Commissioner of Patents